United States Patent

Nugent et al.

[15] 3,674,975

[45] July 4, 1972

[54] APPARATUS FOR ASSEMBLING STACKS

[72] Inventors: Reginald F. Nugent, Yardley, Pa.; George P. Snyder, Trenton, N.J.

[73] Assignee: Time Research Laboratories, Inc., Pennington, N.J.

[22] Filed: Nov. 6, 1969

[21] Appl. No.: 874,505

[52] U.S. Cl. ....................219/85, 29/626, 219/79, 219/347, 219/349

[51] Int. Cl. ....................B23k 1/02

[58] Field of Search ....................219/85, 79, 80, 347, 349, 354, 219/358, 405, 411; 29/498, 628, 503; 228/1, 4

[56] References Cited

UNITED STATES PATENTS

| | | | |
|---|---|---|---|
| 3,486,004 | 12/1969 | Morrone | 219/347 |
| 3,465,116 | 9/1969 | Dix | 219/85 |
| 3,477,119 | 11/1969 | Smith | 219/128 X |
| 2,521,232 | 9/1950 | Lashells | 219/347 |
| 3,064,118 | 11/1962 | Bukata | 219/85 |
| 3,051,826 | 8/1962 | Avila | 219/85 X |
| 2,788,432 | 4/1957 | Moles | 219/85 |

*Primary Examiner*—J. V. Truhe
*Assistant Examiner*—L. A. Schutzman
*Attorney*—Frederick J. Olsson

[57] ABSTRACT

Equipment for assembling stacks including an infra-red source, a fixed socket, a reciprocating shuttle on which groups of stacks can be loaded in upright position, the shuttle is movable into the socket to form a dry box with the stacks inside, the stacks are then subject to receive infra-red energy through window means in the socket section and mechanical energy through a transducer mounted on the shuttle. After exposure the shuttle is moved away from the socket so that the stacks can be unloaded and replaced by a new group.

9 Claims, 7 Drawing Figures

INVENTORS.
Reginald F. Nugent
BY George P. Snyder

Frederick J. Olsson
ATTORNEY.

INVENTORS.
Reginald F. Nugent
George P. Snyder
BY
Frederick J. Olsson
ATTORNEY.

INVENTORS.
Reginald F. Nugent
BY George P. Snyder

Frederick J. Olsson
ATTORNEY.

INVENTORS.
Reginald F. Nugent
BY George P. Snyder

Frederick J. Olsson
ATTORNEY.

APPARATUS FOR ASSEMBLING STACKS

This invention relates to equipment for use in assembling solid state devices and more specifically relates to equipment for connecting conductors and terminals of solid state devices known as multi-substrate stacks.

One of the principal objects of the invention is to provide equipment for advantageously carrying out the methods of our copending application, Ser. No. 847,374 filed Aug. 4, 1969.

Another object of the invention is to provide equipment for use in solder-connecting terminal pins and conductors of stacks on a high production basis with yields approaching 100 percent as compared with yields varying substantially lower as now attained, when attained at all, with present day equipment.

Another object of the invention is to provide apparatus for solder-connecting conductors and terminal pins of multi-substrate stacks within a miniaturized dry box characterized by structure which provides that the operator's hands can be kept free from the inside of the box both for loading and unloading stacks and for positioning the same for a soldering operation.

Another object of the invention is to provide apparatus for use in solder-connecting conductors and terminal pins of multi-substrate stacks confined in a miniaturized dry box containing an inert gas atmosphere.

Another object of the invention is to provide apparatus for use in solder-connecting conductors and terminal pins of multi-substrate stacks in a miniaturized dry box containing an inert gas atmosphere while subject to both radiant infra-red energy and vibratory mechanical energy.

Another object of the invention is to provide apparatus for use in solder-connecting conductors and terminal pins of multi-substrate stacks in an inert gas atmosphere characterized by a split dry box for containing the desired atmosphere which can be opened and closed by a simple reciprocating motion, the open position being for the loading and unloading of groups of stacks and the closed position being for the stacks to receive radiant infra-red energy through window means in the box and to simultaneously receive mechanical vibratory energy.

Another object of the invention is to provide apparatus for use in connecting components of multi-substrate stacks by the use of infra-red and mechanical vibratory energy including shuttle means for supporting and exposing groups of stacks to the energy, the shuttle being characterized by structure which isolates, shields and cools the same and affords temperature protection to connected parts.

Another object of the invention is to provide apparatus of the kind in question having a split dry box and a source of infra-red energy closely adjacent to, but outside of the box, the dry box comprising a fixed socket and a multiple stack-supporting shuttle movable into the socket to form a dry box containing the stacks and movable away from the socket for the loading and unloading groups of stacks and the socket having window means to transmit infra-red energy to the stacks when the dry box is closed.

Another object of the invention is to provide apparatus of the kind in question having a split dry box and a source of infra-red energy closely adjacent thereto, but outside of the dry box, the dry box comprising a fixed socket and a multiple stack-supporting shuttle movable into the socket to form an inert gas chamber containing the stacks and movable away from the socket for the loading and unloading groups of stacks and the socket having window means to transmit infra-red energy to the stacks when the dry box is closed and the shuttle also having transducer means providing vibratory mechanical energy to the stacks at the time when the same are receiving infra-red energy.

The invention will be described below in connection with the following drawings wherein:

FIG. 1 is a perspective view showing certain of the structure and the positional relationship of the shuttle;

FIG. 1*a* is a perspective view diagrammatically illustrating a portion of a typical stack;

FIG. 1*b* is is a fragmentary perspective view illustrating a modification of certain parts of FIG. 1;

Figures 1, 1A, 1B:
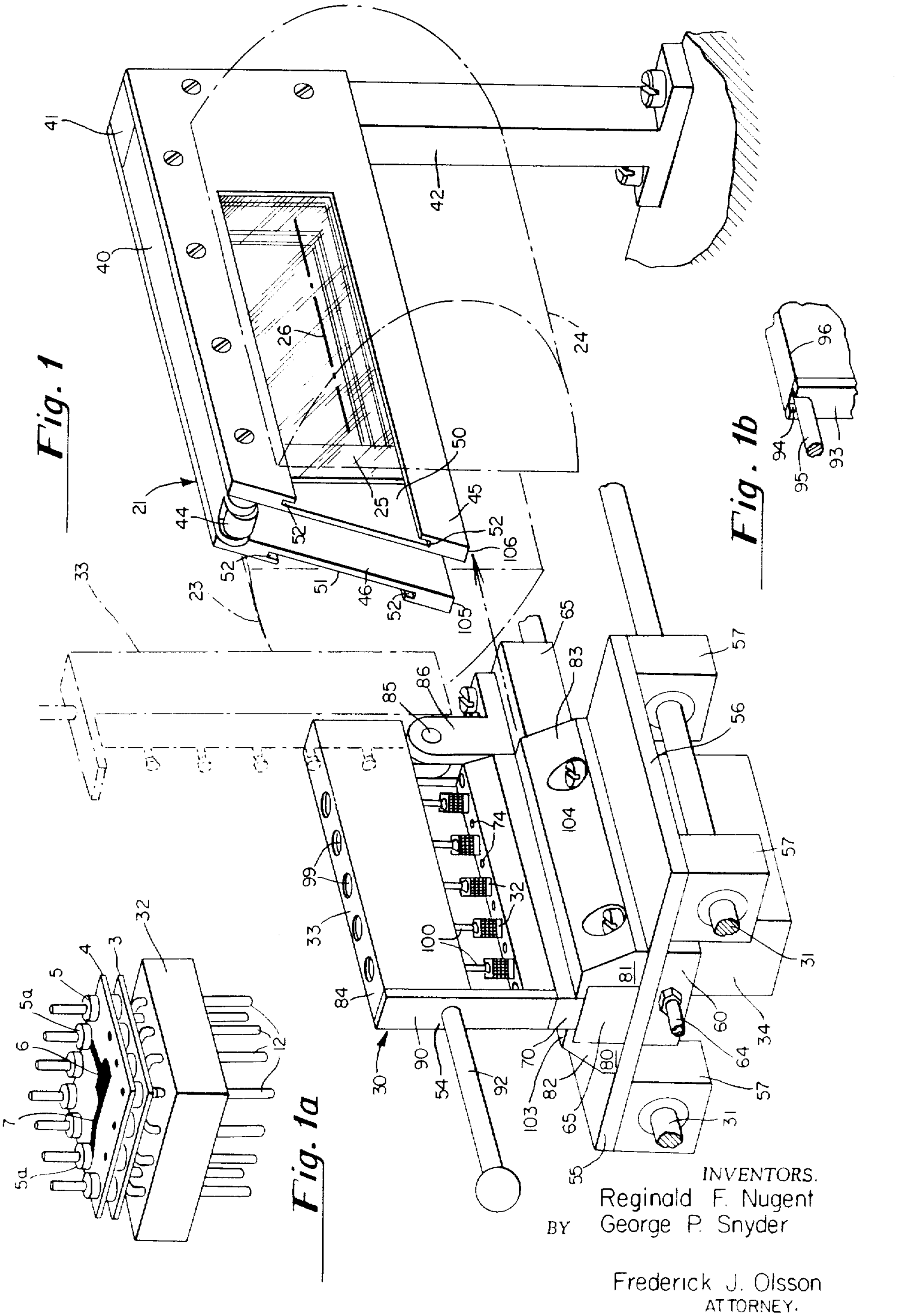

Before proceeding with the description, reference is made to the stacks shown in FIG. 1*a*. The stack has a base 1 inside of which is an insulated block (not shown). The conductor-terminal pins 2 are imbedded in the block and stick up through holes in the top of the base. The substrates 3 and 4 are disposed on the terminal pins and are spaced from one another by separators or spacers 5. The substrate 3 is spaced from the base by that it rests on knees formed in the terminal pins. Substrates and spacers which ordinarily would be mounted above the substrate 4 are not shown. The substrate 4 carries the chip 6 which is connected by the solder conductors 7 to the spacers 5*a*. The spacers 5*a* are made from copper and are solder coated. The solder being bonded both to the terminal pins and to the conductors to complete an electrical connection between the chip 6 and the terminals. The spacers which are not used for an electrical connection are formed as above or from a non-conducting material.

The equipment which is described hereinafter is used to bond the solder on the copper coated spacers to the terminal pins and to the conductors. The connecting operation is performed without the use of flux in an inert gas atmosphere provided by a dry box.

The foregoing description is exemplary only. It will be understood by those skilled in the art that a typical stack may contain as many as a dozen substrates each of which carries one or more chips connected to several of the terminal pins. A composite stack is a complex array of electrical circuits capable of performing an extremely wide variety of functions.

In FIG. 1 the hollow socket 21 is in fixed position between a pair of infra-red lamps indicated by the dot and dash lines 23 and 24. The hollow socket has a pair of quartz plates or windows, one of which is indicated at 25. The infra-red energy from each lamp passes through the respective windows and is concentrated centrally of the hollow socket generally in a tube-like area extending horizontally. The tube-like area is effectively a three dimensional heating zone and is represented by the heavy lines 26.

Disposed in front of the socket is the shuttle 30 which is mounted for reciprocating motion on the guides 31. The shuttle carries a plurality of stacks 32. In the position shown, stacks can be loaded or unloaded from the shuttle. Both the shuttle and stacks are substantially spaced from the infra-red source.

Figure 2:
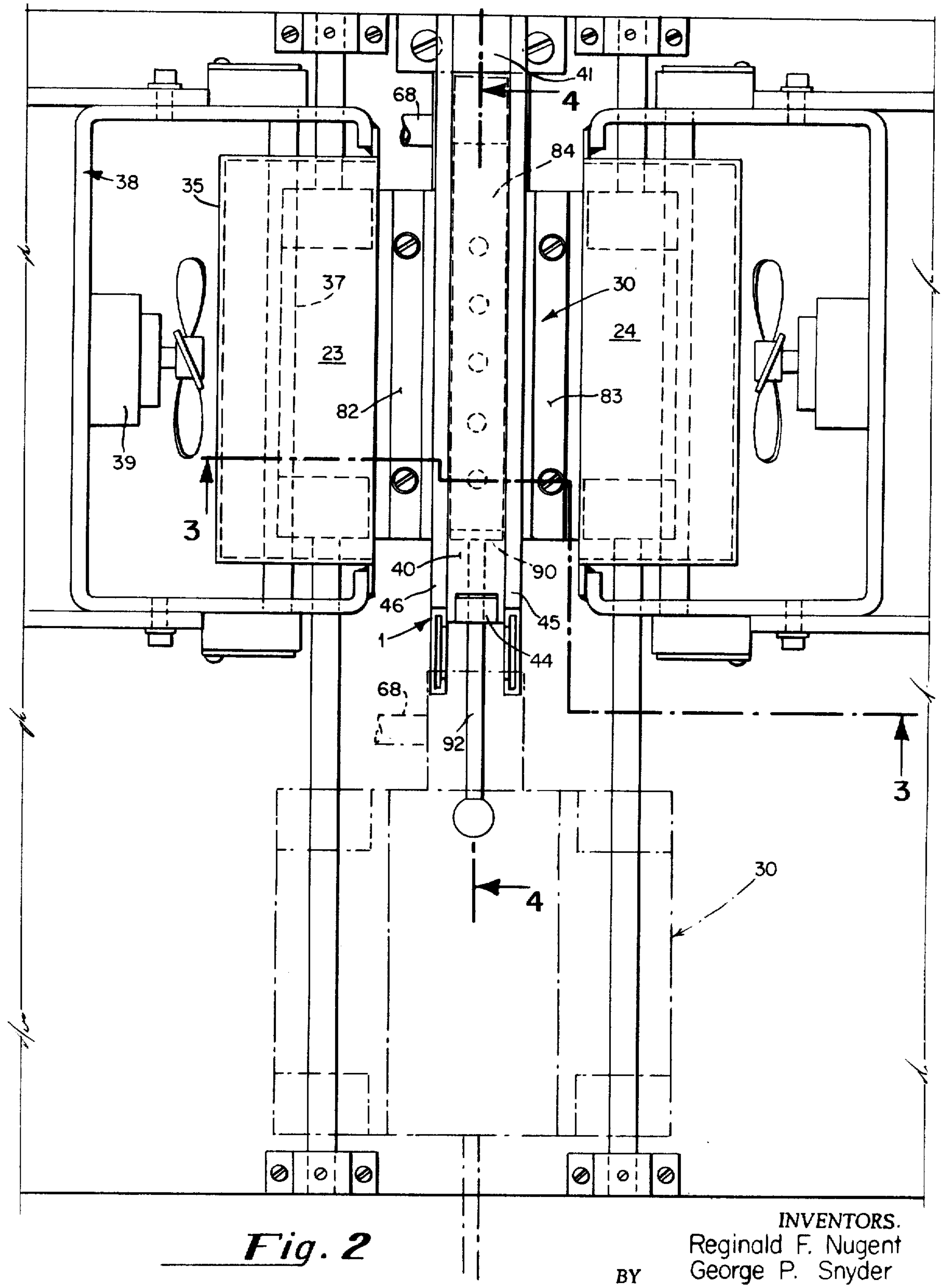
FIG. 2 is a plan view of the components of FIG. 1.

For loading and unloading purposes the arm 33 is moved upwardly to the position shown by the dot and dash lines. With the arm in the down position shown by the full lines, the stacks are maintained firmly on the shuttle. The shuttle is movable from the load-unload position into the socket 21 so that the stacks 32 are within the tube-like area 26 to receive infra-red energy from the lamps. This is termed the heat position. The shuttle carries a transducer 34 which is operative during the time the stacks are receiving infra-red enegy to apply vibratory mechanical energy to the stacks. In FIG. 2 the load-unload position of the shuttle is shown by the dotted lines while the heat position is shown by the full lines.

As will be explained in more detail later when the shuttle is moved to the heat position so that the stacks are within the tube-like area 26 the socket and shuttle cooperate to form a dry box for containing an inert gas atmosphere around the stacks when the same are receiving infra-red and mechanical energy.

The general mode of operation is as follows. The shuttle is placed in the load-unload position and the arm 33 raised upwardly, the stacks are then loaded on the shuttle, the arm is moved down to the full line position and the shuttle moved to the right into the socket to the heat position. The lamps 23 and 24 and the transducer 34 are energized to apply infra-red and mechanical energy to the stacks to perform the connection operation. Afterwards the shuttle is then pulled out of the socket and the arm moved to the upright position. The stacks are unloaded and a new group placed on the shuttle. The structural details of the various components will be described following.

The infra-red lamps 23 and 24 are identical in construction. The lamp 23 includes an eliptical reflector 35 together with the elongated hot tungsten filament 36 within a quartz envelope 37. The filament generates radiant energy in the infra-red band. The filament-envelope structure is conventional. The filament is placed at one of the focal points and the reflector concentrates the radiant energy at the other focal point or in the tube-like area 26 as mentioned in connection with FIG. 1. In FIG. 2 the tube-like area 26 is represented by the large black dot 26'. The concentration area is chosen so that stacks appearing in the area will be sufficiently exposed and the temperature of the components making up the stacks will be raised.

The lamp 23 is mounted on framework 38 to adequately support the lamp in the desired position. The framework provides for the lamps to be adjustable to cause the infra-red tube-like areas of both lamps to substantially coincide at the tube-like area 26. A fan 39 is provided to air-cool the reflector 35. The infra-red lamp 24 is similarly constructed and mounted.

The preferred structure of the socket 21 will be described in connection with FIGS. 1 and 4.

The socket includes a horizontally extending top 40, a vertically extending back 41, the lower portion 42 of which extends down to be connected to a fixed platform 43. The back 41-42 forms an abutment engaged by the shuttle to define the heat position. A guide roller 44 is provided on the forward part of the top 40. The purpose of the guide roller is to push down the arm 30 if it enters the socket not fully in its down position.

The socket includes a pair of vertically extending sides 45 and 46 which respectively have cutouts 50 and 51. Slots 52 are provided on the top and bottom portions of the cutouts 50 and 51. These slots respectively hold the windows or quartz plates 53 and 25. As will be apparent, the socket has an opening comprising an open front and an open bottom.

The preferred structure of the shuttle 30 will be described in connection with FIGS. 1 and 4.

The shuttle 30 comprises a top section 54 and a bottom section 55. The bottom section 55 includes the plate 56 and the bearing blocks 57 which respectively are slidably supported on the guides 31.

On the bottom of the plate 53 between the blocks 57 is a water jacket 60 provided with connectors 61 and 62 secured to flexible conduits 63 and 64 connected to a pump not shown to provide for water to circulate through the jacket. One of the purposes of circulating the water is to remove heat from the shuttle developed in the shuttle as a result of exposure to the infra-red energy in the heat position.

On top of the plate 56 is a gas block 65 having a gas manifold 66 and a connector 67 attached to the flexible inert gas line 68 connected to an inert gas supply.

The flexible conduits 63 and 64 and flexible gas line 68 provide that the shuttle can be moved back and forth between the load and unload positions without difficulty.

On top of the gas block 65 is a cradle block 70 having a plurality of cradles 71 each comprising a bore 72 and a rectangular section 73. A bore 72 accommodates the lower portions of the stack terminal pins while the base of the stack is accommodated by or rests on the rectangular section 73.

The cradle block 70 has a plurality of passageways 74 which are in communication with the manifold passageways 75 in the gas block 65. Gas in the manifold 66 can pass up through he passages 75 and 74 into the area on top of the cradle and surround the substrates of the stacks.

Disposed on either side of the cradle block 70 are the reflector bars 80 and 81 which have slanted reflecting surfaces 82 and 83. The purpose of the reflecting surfaces 82 and 83 is to reflect the infra-red energy of the lamps away from the shuttle and thereby assist in maintaining the temperature of the shuttle at a desirable lower limit.

The arm 33 on the shuttle is comprised of the spanner 84 which makes a pivotal connection 85 with the bracket 86 mounted on the block 65 together with a front plate 90 which rests on a shoulder 91 on the cradle block 70 and mounts the push rod 92. Alternatively, the plate 90 can be fixed to the cradle block as shown in FIG. **1*b* where the plate 93 is fixed to the cradle block which has a cutout 94 which accommodates the push rod 95 directly connected to the spanner 96**.

Figure 4:
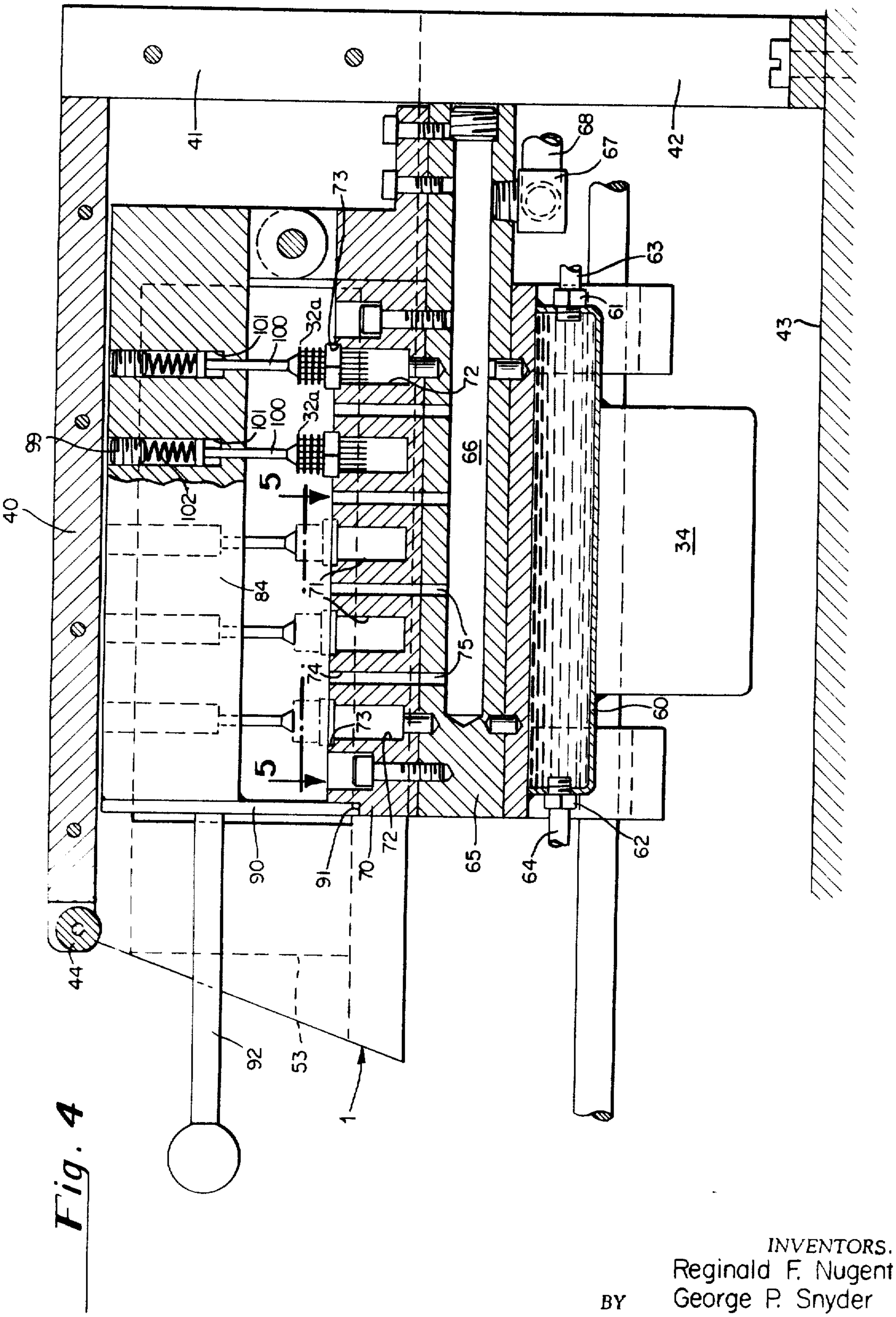
FIG. 4 is an elevational view partially in section taken along the lines 4—4 of FIG. 3.

As best shown in FIG. 4, the arm 33 is provided with a plurality of identical gripper devices 100. Each gripper is mounted for reciprocating motion within a bore 101 and is biased outwardly as by the spring 102. When the arm 33 is in the down position the grippers 100 respectively engage blank substrates on the tops of the stacks and the spring pressure forces the bases down against the shoulders 72 of the cradle and applies a holding or gripping pressure thereto. The spring-loaded grippers maintain pressure during the application of infra-red and mechanical energy.

As pointed out in copending application, Ser. No. 847,374, it is preferred to apply the vibratory mechanical energy to the stacks through a water medium. For this purpose the transducer 34 is fixed to the bottom of the water jacket 60.

With reference to FIGS. 1 and 4, it will be noted that the top surfaces 103 and 104 on the reflector bars 80 and 81 make a close fit with the bottom edges 105 and 106 of the sides of the socket. Thus, when the shuttle is in the heat position the open bottom of the socket is effectively closed off. Also, with reference to FIGS. 2 and 3 it will be observed that the width of the plate 90 and block 70 is chosen with respect to the spacing between the sides 45 and 46 of the socket so that when the shuttle is in the heat position the plate and block effectively close off the open front of the socket.

Thus, when the shuttle is in the heat position the socket and shuttle cooperate to form a mini-dry box which can receive heat from outside infra-red sources, receive an inert gas atmosphere and partake of vibrations generated by the transducer 34.

As to the dry box, it is pointed out that while the various components are manufactured under relatively tight tolerances, the assembled parts are not interfitted to make a complete gas seal. Also, the parts make a sliding, but a close fit. The fit is not sufficient to seal the dry box. The parts fit together in a manner sufficient to retard the flow of gas. Thus, the inert gas can be introduced into the dry box at a rate related to the leakage of the gas so that the box will be purged of oxygen and the stacks within the box enveloped in the inert gas atmosphere during the heating or connecting operation.

The various parts of the shuttle as heretofore described are made from metal and are machined and tied together in a manner so as to make a rigid, substantial, unitary structure. When the transducer 34 is energized, the vibrations of the water in the water jacket will be reflected in the plate 55, gas block 65, cavity block 70, etc. The pressure under which the grippers 100 hold down the stacks in the cradles is sufficient so that the vibratory mechanical energy is applied to the stack structure.

Figure 3:
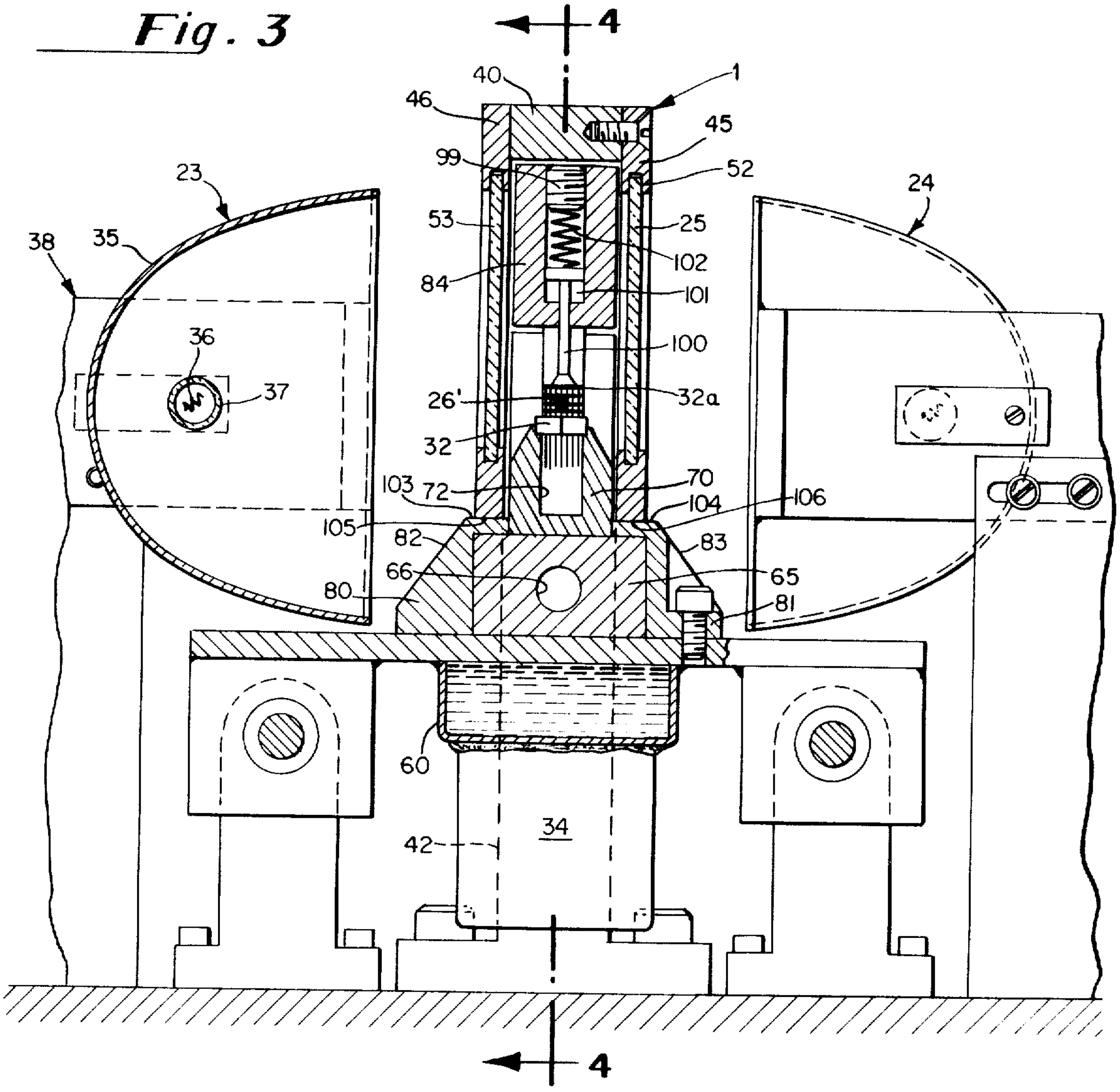
FIG. 3 is an elevational view partially in section taken along the lines 3—3 of FIG. 2.
Figure 5:
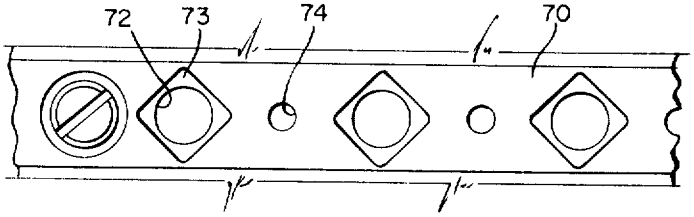
FIG. 5 is a fragmentary plan view taken along the lines 5—5 of FIG. 4.

With reference to FIG. 3 it will be noted that in the heat position the top section 54 of the shuttle extends in the lamp field whereas the bottom 55 is without the field. This two part shuttle structure provided with the cooling means as described has the particular advantage that the temperature of the shuttle is maintained low enough to avoid damage to the newly loaded stacks, to the transducers 34 and to maintain the efficiency of the water as a vibratory medium. Even during a full eight hour day operation wherein the shuttle is intermittently exposed to the infra-red the lower temperature is maintained.

The intermittent type operation wherein groups of stacks are successively worked has several advantages. By keeping the group within reasonable limits the stacks can be loaded and unloaded in a quick and positive manner. The desired infra-red and mechanical energy levels are within easily attainable values and the time required inside the dry box for the connecting operation is only a fraction of a minute. Production rates of one hundred stacks an hour with yields approaching 100% are obtained.

Another advantage of the equipment described is that the operator's hands are not required to enter the dry box. Thus, the box can be made relatively small and this factor saves large quantities of gas during an operating day and permits the equipment to be relatively small and allows maximum freedom of movement on the part of the operator.

With reference to FIG. 4 it will be observed that the shoulder sections 73 are oriented to present the sides of the stacks at a 45° angle within the tube-like infra-red area. This orientation is used in order that the respective sides of the stack will receive the infra-red energy. In the event the stacks are of the circular or round type no particular orientation is required.

Before closing, it is pointed out that the structure of the shuttle is ideally suited for use in an arrangement where the stacks need not be connected in an inert gas atmosphere. In such cases the socket is not used and the shuttle is operated in a manner as described heretofore. Also it will be understood that the apparatus is adaptable for heating operations not involving the simultaneous application of infra-red and mechanical energy.

We claim:

1. Apparatus for applying infra-red energy and mechanical energy to multi-substrate stacks for connecting components thereof comprising:
   - a pair of spaced apart lamps each comprising means to produce radiant energy whose wave length is substantially in the infra-red band, and concentrate the energy of each lamp in an elongated tube-like area extending generally horizontally;
   - a shuttle mounted between said lamps for reciprocating motion along horizontal axis between a load-unload position and a heat position, the shuttle having means to support a plurality of stacks in upright position in the shuttle, when in the heat position, placing the stacks within said tube-like area to receive infra-red energy and when in the load-unload position substantially separating the stacks from said tube-like area;
   - an arm pivotally mounted on said shuttle for movement toward and away from said cradles as between an up position and a down position;
   - a plurality of grippers mounted on said arm and serially disposed side-by-side along an axis so that when the arm is in the down position the grippers are respectively positioned to engage the stacks in the cradle and grip the same and apply pressure thereto when the shuttle in in the heat position;
   - means connected to apply vibratory mechanical energy to the stacks gripped in the shuttle, last said means being operable when the stacks are receiving infra-red energy; and
   - a water jacket on said shuttle including means for circulating water through the jacket, the circulation providing for cooling of the shuttle.

2. Apparatus for applying infra-red energy and mechanical energy to multi-substrate stacks for connecting components thereof comprising:
   - a pair of spaced apart lamps each comprising means to produce radiant energy whose wave length is substantially in the infra-red band, and concentrate the energy of each lamp in an elongated tube-like area extending generally horizontally;
   - a shuttle mounted between said lamps for reciprocating motion along a horizontal axis between a load-unload position and a heat position, the shuttle having a top section and a bottom section, the top section extending into the field of said lamps and the bottom section being substantially without the field when the shuttle is in the heat position;
   - means on the top section of the shuttle forming a plurality of cradles serially disposed side-by-side along an axis for respectively supporting a plurality of stacks in upright position, when the shuttle is in the heat position, means placing the stacks within said tube-like area to receive infra-red energy therefrom and the cradles, when the shuttle is in the load-unload position, substantially separating the stacks from said tube-like area;
   - means mounted on said shuttle and moveable therewith between the load-unload and heat positions and engaging the stacks and applying pressure thereto to grip the same in the cradles when the shuttle is in the heat position and the stacks are receiving infra-red energy;
   - a water jacket on said bottom section including means for circulating water through the jacket, the circulation providing for cooling of the shuttle;
   - shielding means disposed below said cradles on opposite sides thereof for reflecting said infra-red energy from the shuttle to assist in said cooling; and
   - transducer means mounted on said water jacket and supplying vibratory mechanical energy to the stacks gripped in the cradles when the shuttle is in the heat position and the stacks are receiving infra-red energy.

3. Apparatus for applying infra-red energy and mechanical energy to multi-substrate stacks for connecting terminal pins and conductors thereof comprising:
   - a socket including a horizontally extending top, a vertically extending back and a pair of vertically extending sides, each side including a quartz plate, the top, sides and back being closed and the front and bottom being open;
   - a pair of lamps disposed on opposite sides of said socket, each comprising means for producing radiant energy whose wave length is substantially in the infra-red band, and for transmitting the energy from the lamps through said quartz plates and for concentrating said energy in an elongated tube-like area extending generally horizontally within said socket;
   - a shuttle mounted for reciprocating motion along a horizontal axis between a load-unload position and a heat position, the shuttle having a top section and a bottom section, said top section extending into said socket when the shuttle is in the heat position;
   - means on the top section of the shuttle forming a plurality of cradles serially disposed side-by-side along an axis for respectively supporting a plurality of stacks in upright position, means comprising the shuttle placing the stacks within said tube-like area to receive infra-red energy through said quartz plates when the shuttle is in the heat position, and when the shuttle is in the load-unload position, substantially separating the stacks from said tube-like area;
   - an arm having a plurality of yieldably mounted grippers, the arm being pivotally mounted on said top section for tilting motion as between an open position for the loading and unloading of stacks and a closed position wherein the grippers engage the respective stacks and apply gripping pressure thereto;
   - a plate on said arm for closing off said open front when the arm is in the closed position and the shuttle is in the heat position;
   - means on said top section for closing off said open bottom when the shuttle is in the heat position, the socket and the top section therein forming a dry-box for containing an inert gas atmosphere around said stacks;
   - a water jacket on said shuttle including means for circulating water through the jacket, the circulation providing for cooling of the shuttle;
   - means connected to said shuttle to apply vibratory mechanical energy to the stacks gripped in the cradles, last said means being operable when the stacks are receiving infra-red energy; and
   - means for conducting inert gas into said dry-box.

4. Apparatus for applying infra-red energy and mechanical energy to multi-substrate stacks for solder-connecting terminal pins and conductors thereof comprising:

a socket including a horizontally extending top, a vertically extending back and a pair of vertically extending sides, each side including a quartz plate, the top, sides and back being closed and the front and bottom being open;

a pair of lamps disposed on opposite sides of said socket, each comprising means to produce radiant energy whose wave length is substantially in the infra-red band, and whose energy is respectively transmitted through said quartz plates and concentrated in an elongated tube-like area extending generally horizontally within said socket;

a shuttle mounted for reciprocating motion along a horizontal axis as between a load-unload position and a heat position, the shuttle having means to support and grip a plurality of stacks in upright position, and means for placing the stacks within said tube-like area to receive infra-red energy through said windows when the shuttle is in the heat position, and when in the load-unload position to substantially separate the stacks from said tube-like area, the shuttle having a mechanism cooperating with said socket to close off the said open front and open bottom when the shuttle is in the heat position whereby the socket and the shuttle form a dry-box for containing an inert gas atmosphere around the stacks;

means connected to said shuttle to apply vibratory mechanical energy to the stacks gripped in the shuttle, last said means being operable when the stacks are receiving infra-red energy;

a water jacket on said shuttle including means for circulating water through the jacket, the water providing for cooling of the shuttle; and means for conducting inert gas into said dry-box.

5. Apparatus for applying infra-red energy to solid state devices comprising:

a pair of spaced apart lamps each comprising means to produce radiant energy whose wave length is substantially in the infra-red band and to concentrate the energy of each lamp in an elongated tube-like area extending generally horizontally;

a shuttle mounted between said lamps for reciprocating motion along a horizontal axis between a load-unload position and a heat position, the shuttle having a top section and a bottom section, the top section extending into the field of said lamps and the bottom section being substantially without the field when the shuttle is in the heat position;

means on the top section of the shuttle forming a plurality of cradles for respectively supporting a plurality of devices, the cradles comprising means placing the devices within said tube-like area to receive infra-red energy therefrom and the cradles comprising means substantially separating the devices from said tube-like area when the shuttle is in the load-unload position;

means on said bottom section for removing heat developed in the shuttle by its exposure to said infra-red energy to provide for cooling of the shuttle;

an arm pivotably mounted on said shuttle for movement toward and away from said cradles as between an up position and a down position; and a plurality of grippers mounted on said arm and serially disposed side-by-side along an axis so that when the arm is in the down position the grippers are respectively positioned to engage the stacks in the cradle and grip the same and apply pressure thereto when the shuttle is in the heat position.

6. Apparatus for applying infra-red energy to solid state devices comprising:

a socket including an opening and quarts means forming at least part of the socket;

a pair of lamps disposed on opposite sides of said socket, each comprising means to produce radiant energy whose wave length is substantially in the infra-red band and respectively transmit said energy through said quartz and concentrate it in in an elongated tube-like area extending within said socket;

a shuttle mounted for reciprocating motion between a load-unload position and a heat position, the shuttle having means to support a plurality of devices and partially extend into said socket and to place the devices within said tube-like area to receive infra-red energy through said quartz when in the heat position, and when in the load-unload position to substantially separate the devices from said tube-like area, and the shuttle having mechanism cooperating with said socket to close off the said opening when the shuttle is in the heat position whereby the socket and shuttle form a dry box for containing an inert gas atmosphere around the stacks;

means on said shuttle for removing heat developed in the shuttle by its exposure to said infra-red energy to provide for cooling of the shuttle; and means for conducting inert gas into said dry box.

7. Apparatus applying infra-red energy to solid state devices comprising:

a socket including an opening and quartz means forming at least part of the socket;

a pair of lamps disposed on opposite sides of said socket, each comprising means to produce radiant energy whose wave length is substantially in the infra-red band and respectively transmit the energy through said quartz and concentrate it in an elongated tube-like area extending within said socket;

a shuttle mounted for reciprocating motion between a load-unload position and a heat position, the shuttle having means to support a plurality of devices in the shuttle, and when in the heat position to partially extend into said socket and place the devices within said tube-like area to receive infra-red energy through said quartz and when in the load-unload position to substantially separate the devices from said tube-like area, the shuttle having a mechanism cooperating with said socket to close off the said opening when the shuttle is in the heat position whereby the socket and shuttle form a dry box for containing an inert gas atmosphere around the stacks;

means engaging the devices and applying pressure thereto to grip the same in the shuttle when the shuttle is in the heat position;

means on said shuttle for removing heat developed in the shuttle by its exposure to said infra-red energy to provide for cooling of the shuttle; and means for conducting inert gas into said dry box.

8. Apparatus for applying infra-red energy and mechanical energy to multi-substate stacks for connecting components thereof comprising:

a pair of spaced apart lamps each comprising means to produce radiant energy whose wave length is substantially in the infra-red band; and concentrate the energy of each lamp in an elongated tube-like area extending generally horizontally;

a shuttle mounted between said lamps for reciprocating motion along a horizontal axis between a load-unload position and a heat position, the shuttle having a top section and a bottom section, the top section extending into the field of said lamps and the bottom section being substantially without the field when the shuttle is in the heat position;

means on the top section of the shuttle forming a plurality of cradles serially disposed side-by-side along an axis for respectively supporting a plurality of stacks in the upright position and when the shuttle is in the heat position to place the stacks within said tube-like area to receive infra-red energy therefrom and when the shuttle is in the load-unload position to substantially separate the stacks from said tube-like area;

an arm pivotably mounted on said shuttle for movement toward and away from said cradles between an up position and a down position;

a plurality of grippers mounted on said arm and serially disposed side-by-side along an axis so that when the arm is in the down position the grippers are respectively positioned to engage the stacks in the cradle and grip the same and apply pressure thereto when the shuttle is in the heat position and the stacks receiving infra-red energy;

a water jacket on said bottom section including means for circulating water through the jacket for cooling of the shuttle; and transducer means mounted on said shuttle for supplying vibratory mechanical energy to the stacks gripped in the cradles when the shuttle is in the heat position and the stacks are receiving infra-red energy.

9. Apparatus for applying infra-red energy and mechanical energy to multi-substrate stacks for connecting components thereof comprising:

a pair of spaced apart lamps each comprising means to produce radiant energy whose wave length is substantially in the infra-red band, and concentrate the energy of each lamp in an elongated tube-like area extending generally horizontally;

a shuttle mounted between said lamps for reciprocating motion along a horizontal axis between a load-unload position and a heat position, the shuttle having a top section and a bottom section, the top section extending into the field of said lamps and the bottom section being substantially without the field when the shuttle is in the heat position;

means on the top section of the shuttle forming a plurality of cradles serially disposed side-by-side along an axis for respectively supporting a plurality of stacks in upright position, and placing the stacks within said tube-like area to receive infra-red energy therefrom when the shuttle is in the heat position and when the shuttle is in the load-unload position, substantially separating the stacks from said tube-like area;

means engaging the stacks and applying pressure thereto to grip the same in the cradles when the shuttle is in the heat position and the stacks are receiving infra-red energy;

a water jacket on said bottom section including means for circulating water through the jacket, the circulation providing for cooling of the shuttle; and transducer means mounted on said shuttle for supplying vibratory mechanical energy to the stacks gripped in the cradles when the shuttle is in the heat position and the stacks are receiving infra-red energy.

* * * * *